Sept. 10, 1968    M. B. A. POTTIER ET AL    3,400,849
TANKS FOR THE STORAGE AND TRANSPORT OF CRYOGENIC FLUIDS
Filed April 1, 1966    2 Sheets-Sheet 1
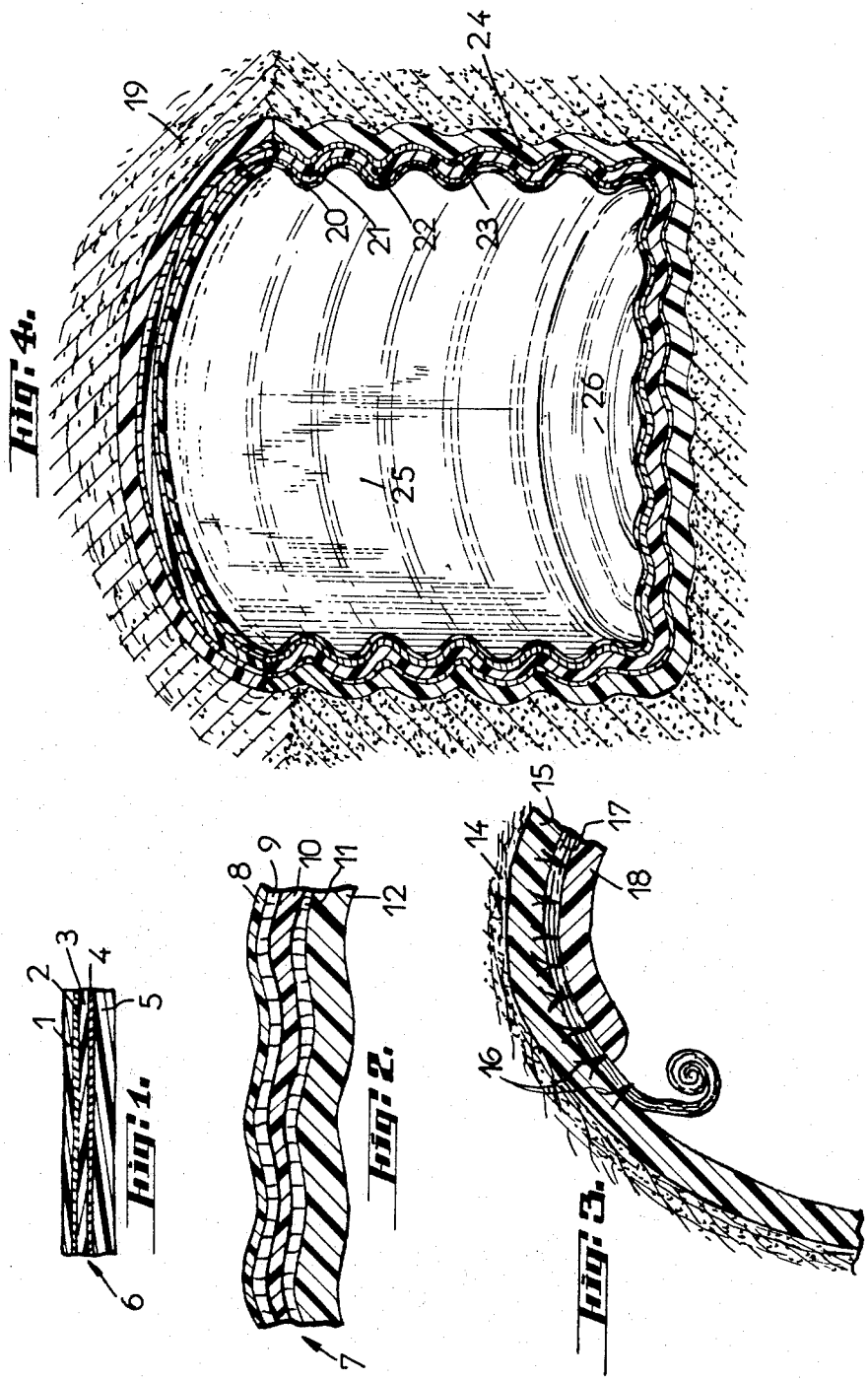

Sept. 10, 1968   M. B. A. POTTIER ET AL   3,400,849
TANKS FOR THE STORAGE AND TRANSPORT OF CRYOGENIC FLUIDS
Filed April 1, 1966   2 Sheets-Sheet 2
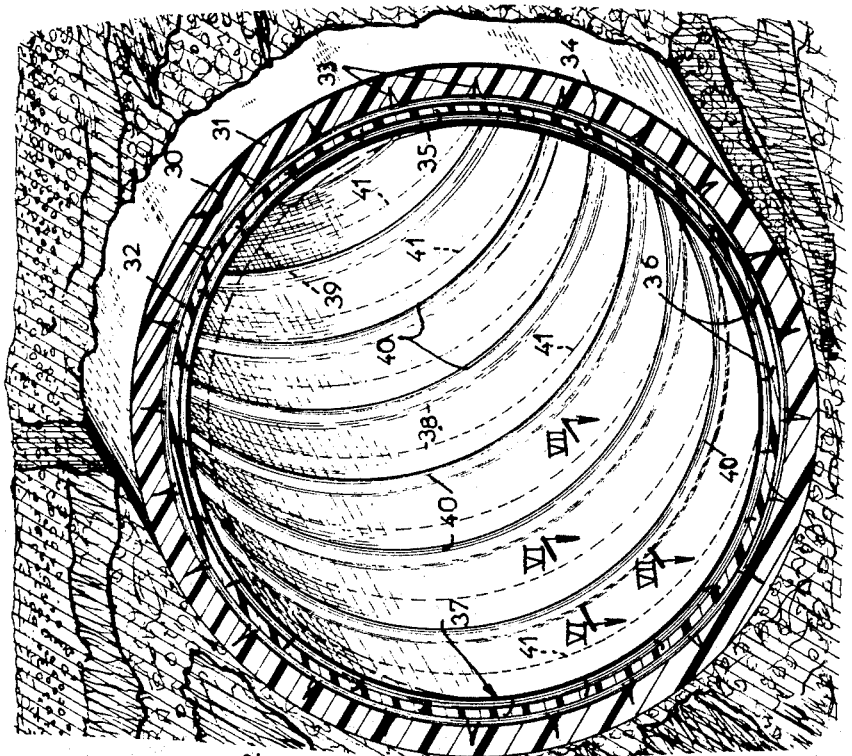
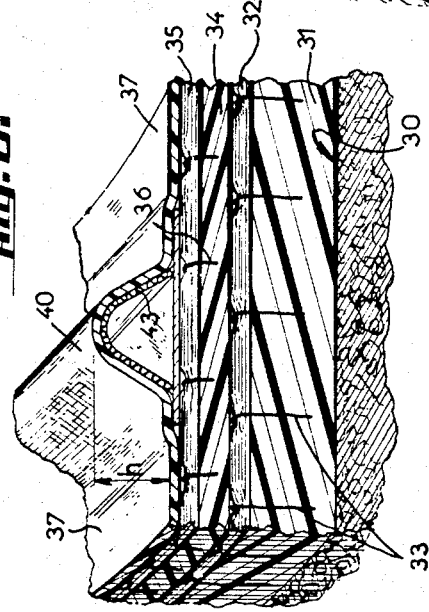
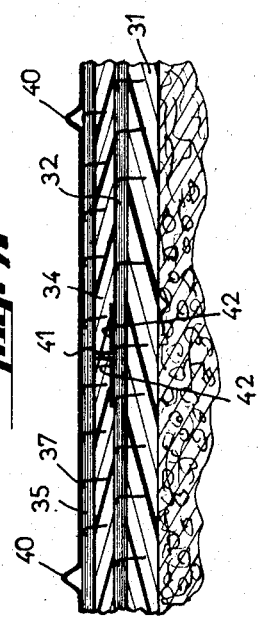

3,400,849
TANKS FOR THE STORAGE AND TRANSPORT
OF CRYOGENIC FLUIDS
Michel Bernard Auguste Pottier, La Plaine Saint-Denis, and Charles Bernard Roux, Paris, France, assignors to Service National dit: Gaz de France, Paris, France, a National Service of France
Filed Apr. 1, 1966, Ser. No. 539,417
Claims priority, application France, Apr. 2, 1965, 52,946, 11,788
6 Claims. (Cl. 220—9)

ABSTRACT OF THE DISCLOSURE

A tank for cryogenic fluid, comprising an internal heat insulating lining consisting of a plurality of superimposed layers made in alternance of a heat insulating rigid material and of a flexible material, said layers of flexible material being thin and the thickness of layers of rigid insulating material gradually increasing from the inner layers to the outer ones.

---

It is known that at the present time, with the considerable development of the liquefaction of cryogenic fluids in industry, such as notably methane or natural gas, endeavors are being made with a view to construct cryogenic fluid storage or transport tanks capable of meeting any practical requirements.

Two essential problems arise in the construction of these tanks, namely: on the one hand the strength of the mechanical structure of the tank, and on the other hand the minimization of heat exchanges between the very cold cryogenic fluid and the external walls of the tank attaining as a rule a temperature approximating the value of the surrounding medium.

Up to now, very encouraging results from the economical as well as from the mechanical or thermal point of view have been obtained with tanks having a rigid mechanical structure, and lined with internal layers of expanded synthetic foams such as polyurethane foams having very low coefficients of heat conductivity, which are particularly valuable for the purpose contemplated. These foam layers are easily applicable on the site to the rigid walls of a tank, which may be for instance rigid metal walls, or to the edges of a cavity formed in a rock bed or in any other types of soils.

Unfortunately, cracks develop in the insulating layer notably during the cooldown chilling or filling of tanks of this type. More particularly, as a consequence of the heat stress developing within the insulating layer cracks tend to develop therein. Therefore, the insulating layer cannot constitute a normally impervious wall and one or a plurality of fluid-tight coatings, films or layers must be disposed on or within the insulation to constitute barriers preventing the leakage of cryogenic fluid to the outside of the tank. Besides, the cracks developing in the insulating layer are likely to impair the strength and the adherence of the insulating layer, taken as a whole, lining the internal walls of the tanks.

It is the essential object of the present invention to avoid these drawbacks. The insulation according to this invention is remarkable notably in that it comprises superposed stratified layers respectively of a solid (i.e., rigid) insulating material such as polyurethane foam, and layers of a fibrous material such as glass felt, which do not transmit tractive efforts but only pressure or compressive stress, the surface of these layers extending substantially at right angles to the pressure stress exerted by the fluid within the tank and being substantially parallel to the isothermal surfaces existing within the insulation.

In more vivid terms, it may be said that with this structure superposed "floating" layers of a solid insulating material are constituted, somewhat in the fashion of the so-called "floating" floor technique, wherein a first layer of concrete is cast, whereafter a glass wool layer is spread, this layer being subsequently covered with a tarred paper; then, another concrete layer is cast, this type of construction preventing sound vibration from being transmitted through the resulting floor structure.

According to another feature characterizing this invention, at least some of the layers have a moderate relative thickness for example of the order of one-tenth or one-twentieth of the total thickness of the insulating layer, the thickness of the various insulating layers being subordinate to the nature of these layers and also to the maximum temperature gradient to which they are to be subjected.

Advantageously, the thickness of the solid insulating layers are so selected as to decrease from the external carrier "skin" of the tank to the internal impervious "skin."

According to another feature of this invention, corrugations and/or expansion joints directed substantially at right angles to the directions of moderate or zero curvatures of said layers are formed in at least some of said insulating layers. In other words, when following a direction of moderate or zero curvature, each one of said corrugations and/or expansion joints are met successively.

Advantageously, the fluid-tight skin or skins thus used, notably on the contact surface between the insulation and the stored liquid, are provided with corrugations and/or expansion joints also extending at right angles to the directions of moderate or zero curvatures of said layers.

It was observed that by using these various arrangements a heat insulation considerably less liable to develop cracks than those of hitherto conventional structures was obtained.

According to a preferred form of embodiment of the invention the thin fluid-tight sheet contacting the stored liquid consists of a polyester sheet. In fact, it was observed that this material was capable of withstanding very sudden and strong thermal shocks such as those resulting from the sudden pouring of liquefied natural gas (LGN) at temperatures of the order of $-160°$ C., the sheet being initially at a room or normal temperature.

If desired, one or a plurality of fluid-tight sheets or skins may be provided, notably in the vicinity of the contact surface between the insulation and the cryogenic fluid. Thus, in case of local cracks developing in the insulating layer no fluid can leak towards a deeper layer, and the general strength of the layer is still very satisfactory.

Other features and advantages of this invention will appear as the following description proceeds with reference to the accompanying drawings given by way of example and wherein:

FIGURE 1 illustrates diagrammatically the basic principle of the elements constituting an insulating layer according to this invention;

FIGURE 2 is a diagram similar to FIGURE 1 but showing a different form of embodiment;

FIGURE 3 shows the manner in which an insulating layer according to this invention can be applied to the inner walls of a tank.

FIGURE 4 shows in perspective view with parts broken away a tank of generally cylindrical configuration constructed, and provided with an insulating lining according to this invention, the thickness of the insulating layers having been exaggerated in the drawing in order to show them more clearly;

FIGURE 5 shows in perspective and vertical sectional view with parts broken away the wall structure of a tank according to a modified form of embodiment, the thickness of the various insulating layers being exaggerated in order to show them more clearly;

FIGURE 6 is a perspective and sectional view showing on a larger scale with parts broken away, substantially along the line VI—VI of FIGURE 5, the structure of the insulating layer across an expansion joint;

FIGURE 7 is a view showing on a smaller scale than FIGURE 5 and in section taken upon the line VII—VII of FIGURE 5 the insulating layer according to this invention.

According to the exemplary form of embodiment shown in FIGURE 1, the insulating layer or lagging according to this invention consists of various layers, for example five successive layers 1 to 5, of a thickness increasing gradually for example from layer 1 to layer 5. More particularly, layer 5 is considerably thicker than layer 1. When such a composite insulating layer 6 is used, and the layer 1 is caused to contact the cold cryogenic fluid, layer 5 being kept for example at room temperature, it will be observed that the thinner this composite layer, the lower its tendency to crack in comparison with the various other layers, notably those nearest to the cryogenic fluid, provided however that the insulating layer can undergo a free distortion in a direction parallel to its plane. Moreover, it was observed that although certain layers, such as layers 2 and 4, did not transmit stress, notably tractive stress, at right angles to the surface of the insulation, the composite insulation 6 was considerably less prone to crack.

By way of example, to store cryogenic fluid a composite insulating layer such as 6 comprising for example layers 1, 3 and 5 of closed-cell polyurethane foam, impervious to liquids, and layers 2 and 4 of fibrous material such as glass fiber felt, which cannot transmit notably tractive stress, constitute a very satisfactory heat-insulating and impervious barrier.

As an example of basic proportions, the relative thickness of certain layers, notably those nearest to the cryogenic liquid should be rather moderate, for example of the order of one-tenth or one-twentieth of the total thickness of the insulating lagging. Under these conditions, in FIGURE 1, layers 1 and 3 normally have a lower relative thickness than that illustrated in the drawing.

When, as in the most general case, distortion, notably by contraction, is likely to be applied to the insulating layer in a direction parallel to its surface, it is necessary, according to this invention and in order to avoid incipient cracks in the insulation, to provide corrugations and/or expansion joints in this direction, that is, more accurately stated, along lines substantially perpendicular to the directions of moderate or zero curvatures of said layers. This is illustrated in FIGURE 2.

In this figure, it will be seen that a composite layer 7 of insulating material comprises five plies 8 to 12 corrugated about a direction of substantially zero curvature, parallel to the general, substantially plane surface in the zone of said layer 7 which is contemplated herein. Thus, the contraction due to the cooling applied to said layer 7 produces a more or less accentuated flattening of the corrugations without developing any cracks in the different plies. Also in FIGURE 2, the plies 8, 10 and 12 advantageously consist of a closed-cell synthetic foam such as polyurethane foam, and layers 9 and 11 consist of a fibrous material not capable of transmitting tractive stress. The thinnest layer 8 is advantageously the one nearest to the cold cryogenic fluid.

In FIGURE 3, a typical example of a practical construction of an insulating lagging according to this invention on the walls of a tank such as a belowground tank is illustrated. The reference numeral 14 designates the wall of the tank excavated in a soil for example of rocky character. This wall 14 may also consist of a concrete wall. On the wall 14 there is firstly applied, by spraying, a relatively thick layer 15 of closed-cell synthetic foam such as polyurethane foam. On this layer 15 another, relatively thin layer 17 of glass wool felt is unrolled and adequately fastened, for example by means of hooks 16 of plastic or other material of moderate heat conductivity, this layer 17 being capable of providing a slack tractive connection between the layer 15 and the next layer 18 of insulating material which is subsequently sprayed or applied in any suitable manner onto the preceding layer 17. This layer 18 advantageously consists of a material similar to that constituting the preceding layer 15, and its thickness will preferably be inferior to that of layer 15. Of course, the composite layer thus obtained may comprise any desired and suitable number of strata-forming successive layers.

As a rule, the thickness and number of the various insulating layers depend on the nature of these layers and also on the maximum heat gradient to which the insulation is to be subjected.

FIGURE 4 illustrates the manner in which a tank of substantially cylindrical configuration can be coated with an insulating layer according to this invention.

It should firstly be noted that the composite insulating layer deposited on the wall 19 of a substantially cylindrical tank having a more or less flat bottom must necessarily comprise corrugations and/or expansion joints in the vertical direction on the vertical walls of the tank, and concentric corrugations and/or expansion joints on its bottom, so that the mechanical tractive stress developing during temperature variations within the insulating layers in directions parallel to their surface are absorbed by the distortion of said corrugation or expansion joints. In fact, in these directions the curvature of the insulating layer is substantially zero and therefore corrugations or similar relief patterns must be provided in the layer, according to this invention. Under these conditions, a belowground tank of generally cylindrical configuration, constructed according to this invention, will have the shape shown diagrammatically in FIGURE 4. In this figure, it will be noted that the respective layers 20, 21, 22, 23 and 24 are substantially similar to the corresponding layers 8, 9, 10, 11 and 12 illustrated in FIGURE 2.

In this tank construction:

(1) Contraction stress occurring in the insulating layer, for example during the tank cooldown or chilling, are absorbed by the distortion of the corrugations which takes place:

—On the vertical wall 25 of the tanks in a substantially vertical direction,
—On the bottom 26 of the tank in a substantially horizontal plane,
—And in horizontal planes on the vertical walls of the tank: in the form of a slight variation in the diameter of the various layers;

(2) The tractive stress developing in the different successive layers 20 to 24 as a consequence of the existence of a heat gradient within the whole of the insulating layer and to variations in the diameter of the different layers is not transmitted from one sheet to another due to the provision of layers 21 and 23 constituting slack connections between the adjacent layers.

Moreover, notably in the vicinity of the insulation wall contacting the cryogenic fluid, a fluid-tight or impervious sheet or skin is provided which consists for example, of a thin sheet of flexible material such as a composite sheet of synthetic rubber, cotton and aluminium such as the one known under the trade name of "Valluthene."

Various materials of this type may be used, notably those comprising:

—A weft-forming cotton fabric or the like,
—A very thin aluminium sheet constituting the impervious layer,
—Three "sheets" of a material enclosing therebetween as in a sandwich the aforesaid cotton and aluminium component elements, this material consisting for example of "butyl" or polyethylene, the manufacturing methods thereof varying as a function of the materials and specific applications contemplated.

Preferably, however, notably in the elements in contact with the stored cryogenic fluid and as illustrated in the form of embodiment of FIGURES 5 to 7, use is made of a thin sheet of polyester, a material having displayed a remarkable strength at the very low temperatures attained after cooldown.

In the construction of the tank according to the form of embodiment illustrated in FIGURES 5 to 7, the first step consists in forming a large, substantially cylindrical chamber having a circular cross-sectional contour and, for example, a substantially horizontal axis. This chamber may be made of metal sheets, or of any suitable external structure, or it may consist of a gallery excavated in earth or rocky soils, etc. . . . In the example illustrated, it is assumed that the cylindrical chamber 38 having a wall 30 consists of a gallery excavated in a rocky layer. As a rule, it will be advantageous to line the wall 30 of this gallery with cast concrete, cement or the like, according to the technique well known to those conversant with the construction of mining galleries.

This inner wall 30 is subsequently covered with a layer 31 of a solid, heat-insulating material such as expanded polyurethane foam formed for example and preferably on the site by gun-spraying. This layer 31 may consist of one or several successive passes, according to its thickness; in this respect, it may be noted that a pass thickness of the order of ¾" may be obtained without difficulty.

Then, on the layer 31 thus obtained another layers 32 consisting of glass fiber felt is laid and suitably fastened to the underlying insulating layer 31 for example by means of staples or nails 33 of plastic or like material of low heat conductivity. Then, on this glass felt layer 32 another layer 34 for example of expanded polyurethane foam, and preferably thinner than layer 31, is applied. As the specific mass of these expanded polyurethane foams is relatively low, the glass felt applied over the preceding layer 31 by means of said hooks 33 is perfectly capable of supporting the underlying layer 34, notably in the roof portion of the chamber.

Another layer of glass felt or the like 35 is applied on the insulating layer 34 by means of hooks 36 similar to the aforesaid hooks 33. These hooks 36 are sunk into the insulating layer 34. Then, over the last layer of glass felt 35, the internal impervious sheet or skin 37 consisting of a polyester sheet is formed. Preferably, this polyester sheet or skin 37 is formed on the spot by spraying, according to known esterification processes. It may also be formed by means of panels, assembly edge to edge, of polyester sheets welded with overlapping joints according to the known techniques.

According to a modified form of embodiment, the hooks 33 and/or 36 may be dispensed with if care is taken to apply the felt layers 32 and 35 on the respective underlying layers 31 and 34 before they are completely polymerized, the glass felt thus adhering by itself to the polyurethane layers.

In order to indicate typical proportions, it may be assumed that the diameter of the chamber 38 is of the order of 30 to 35 feet, that the thickness of the first polyurethane layer 31 is about 2¾" thick, that the second polyurethane layer is about 2" thick, the thickness of the remaining glass felt layers 32 and 35 being of the order of ½" (a current commercial size) the thickness of the impervious polyester sheet 37 being about ⅛" to ⁵⁄₃₂".

It may be noted that as contracted with the aforesaid "Valluthene" composite sheet, the polyester sheet is relatively rigid and therefore it will not tend to sag under the influence of its own weight. Moreover, it is formed on the site, preferably by spraying, and adhere to the underlying insulating layer instead of being suspended like a curtain if a "Valluthene" composite sheet is used. If desired the polyester layer may be reinforced with glass fibers or fibers of a material preserving its resiliency at very low temperatuers.

During the cooldown, the polyester sheet 37 is slightly contracted (about 2% for a temperature variation of from +30° C. to —160° C.) and therefore it will be slightly lowered as shown by the chain-dotted line 39 in FIGURE 5, to the extent of about 8" in its uppermost portion. As the chamber 38 may have a very considerable length, example 100 feet or more, it is necessary, as already explained, to provide corrugations and/or expansion or distortion joints located in planes perpendicular to the general directions of moderate or zero curvature.

In the specific case contemplated herein distortion joints 40 have thus been provided in substantially vertical planes at right angles to the axis of chamber 38, in order to absorb the expansion and contraction movements of sheet 37 in the axial directions of this chamber 38. Two adjacent joints 40 may be spaced for example about three to four feet from each other, each joint 40 having a height H of the order of four inches and consisting of a curved arc merging into each adjacent straight section of the aforesaid layer 37 by means of an arcuated section of opposite curvature, as shown in FIGURE 6. The joints 40 are obtained for example by projection onto a hollow form 43 of corrugated cardboard pasteboard or the like. In the example described hereinabove no corrugations are provided in the underlying insulating layers and the impervious sheet 37 is supported between two joints 40 by a relatively wide plain or noncorrugated surface. However, it is clear that the sheet 37 provided with its joints 40 may be formed on an underlying insulating corrugated layer, and that the various successive layers of insulating material may comprise corrugations of an amplitude varying from one layer to another, the last layer adjacent to the stored liquid being for example corrugated, the first layer contacting the external structure of the tank being plain.

According to an alternate form of embodiment and with a view to permit the distortion of the solid insulating layers and notably of the layer 34 nearest to the internal wall 37 of the tank, and to avoid the more or less delicate formation of corrugations in these layers, these insulating layers may be divided into panels joined side by side along lines disposed in planes substantially at right angles to the general directions of moderate or zero curvature of the tank.

Thus, in FIGURE 7, layer 34 is shown as being discontinued at 41. This break 41 between the two juxtaposed sections of the insulating layer 34 may be obtained for example by disposing, just before the formation by spraying of said layer 34, sheets 42 of paper or like material as shown in FIGURE 7, which break the continuity of layer 34. The various annular continuous plates of insulating material thus formed may thus move away or towards each other along their junction lines 41 to permit the longitudinal expansion and contraction movements of this insulating layer 34.

Of course, many modifications may be brought to the specific forms of embodiment shown and described herein. Thus the wall structure may comprise a different number of successive alternate strata of an insulating layer of expanded synthetic foam such as a polyurethane foam and a flexible deformable material such as glass fiber felt transmitting only pressure or compressive stress, but not tractive stress, may be contemplated.

Similarly, the thickness values selected for the various layers will depend on the scope contemplated, that is, the desired quality or degree of heat insulation, the tank dimensions, the maximum and minimum temperatures to which the insulation may be subjected, etc. For instance, the data suggested herein for constructing the tank insulation as shown in FIGURE 5 permit of chilling the tank very rapidly, for example within two to three hours time.

Moreover, in certain cases it may be advantageous to use a relatively thin layer of insulating material in the case of the outermost layer which adheres to the carrier structures of the tank and is thus prevented from performing any free distortion movement, the thickness of this layer being notably inferior to that of the next solid insulating layer.

Of course, this invention should not be construed as being limited by the specific forms of embodiment shown and described herein which are given by way of example only. More particularly, several polyester insulating sheets may be contemplated, and for example a second sheet constituting an impervious barrier may be interposed between the aforesaid insulating layers 34 and 32.

Similarly, distortion joints and/or corrugations and/or separations may be provided in directions other than the abovementioned privileged ones.

We claim:

1. A tank for transporting or storing a cryogenic fluid, comprising an external support structure provided with an internal heat insulating lining consisting of a plurality of superimposed layers and of at least one thin impervious sheet covering the innermost layer, wherein said layers are made in alternance of a heat insulating rigid material and of a flexible material able to transmit pressure or compressive stresses but not tractive stresses, said layers of flexible material having a thickness less than one-tenth of the total thickness of said lining and the thickness of at least the innermost layers of said rigid material gradually increasing from the inner layers to the outer ones.

2. Tank according to claim 1, wherein said impervious sheet is a thin sheet of a flexible material comprising notably a weft-forming cotton fabric, a very thin aluminium sheet constituting the impervious layer and three sheets of synthetic rubber enclosing therebetween in a sandwich said cotton and aluminium elements.

3. Tank according to claim 1, wherein said rigid insulating material consists of expanded polyurethane foam and said flexible material consists of a glass fiber felt.

4. Tank according to claim 1, wherein separating paper strips extending in directions substantially normal to the general directions of less curvature of said insulating lining are provided and embedded at intervals at least in the innermost rigid insulating layers.

5. Tank according to claim 1, wherein hollow forms made of board extending in directions substantially normal to the general directions of less curvatures of said insulating lining are provided in said lining, at least between the innermost lining layer and said thin impervious sheet.

6. Tank according to claim 5, wherein said impervious sheet is a polyester sheet.

References Cited

UNITED STATES PATENTS

| | | | |
|---|---|---|---|
| 2,952,987 | 9/1960 | Clauson | 62—45 |
| 3,007,596 | 11/1961 | Matsch | 220—9 |
| 3,093,934 | 6/1963 | Underhill | 52—309 X |
| 3,147,878 | 9/1964 | Wissmiller | 220—9 |
| 3,150,794 | 9/1964 | Schlumberger et al. | 220—9 |
| 3,221,916 | 12/1965 | Rysgaard | 220—9 |
| 3,223,576 | 12/1965 | Evans et al. | 52—309 |

THERON E. CONDON, *Primary Examiner.*

JAMES R. GARRETT, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,849                          September 10, 1968

Michel Bernard Auguste Pottier et al.

It is certified that error appears in the above identified patent and that said Letters Patent are hereby corrected as shown below:

In the heading to the printed specification, lines 9 and 10, "Claims priority, application France, Apr. 2, 1965, 52,946, 11,788" should read -- Claims priority, application France, Apr. 2, 1965, 11,788; Mar. 10, 1966, 52,946 --.

Signed and sealed this 10th day of February 1970.

(SEAL)
Attest:

Edward M. Fletcher, Jr.                        WILLIAM E. SCHUYLER, JR.
Attesting Officer                                  Commissioner of Patents